July 12, 1966
C. T. LUNN
3,259,988
FISH MEASURING DEVICE
Filed July 20, 1964
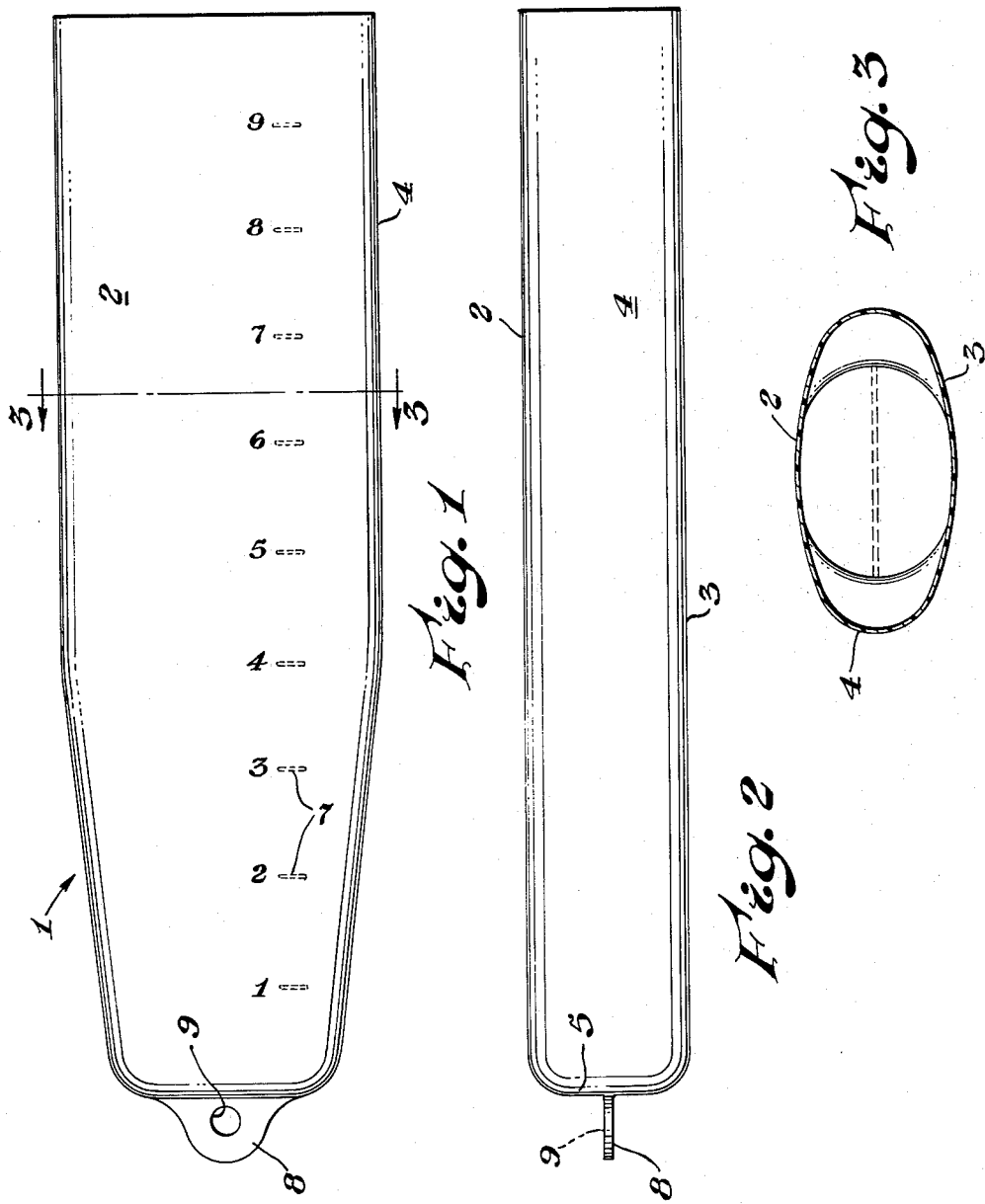
INVENTOR.
Charles T. Lunn
BY Learman, Herman & McCulloch
ATTORNEYS United States Patent Office 3,259,988
Patented July 12, 1966

3,259,988
FISH MEASURING DEVICE
Charles T. Lunn, 2246 Mayfield Road, Saginaw, Mich.
Filed July 20, 1964, Ser. No. 383,850
3 Claims. (Cl. 33—169)

This invention relates to fish measuring devices, and more particularly to a fish measuring instrument which enables the length of a fish accurately to be determined and in such manner as to minimize the risk of injuring or losing the fish.

Most, if not all State legislatures have enacted statutes to regulate sports fishing, and the most frequently encountered statute is concerned with the minimum length fish that can be retained by a fisherman. For example, the State of Michigan currently has a statute establishing seven inches as the minimum length brook trout that legally may be kept by a fisherman. Most of the game laws provide for rather severe penalties in the event of their violation, but quite apart from the penalties that may be imposed for violation of one of the game laws, most of the sports fishermen, for conservation purposes, diligently seek to avoid violating the game laws. Quite often, however, it is not easy to determine whether or not a fish is of legal size. For example, if the limit is seven inches, it is exceedingly difficult to estimate accurately with the eye whether a wriggling, slippery fish is nine, ten or eleven inches in length.

Various kinds of measuring devices have been proposed heretofore for use in assisting a fisherman in ascertaining whether or not a particular fish is within the legal limits, but not all such devices have been altogether satisfactory for a number of reasons. For example, most of the known measuring devices are in the form of tapes or rules which require the fisherman to hold the fish with one hand and the rule or tape with the other. The accurate measuring of a wet, slippery, active fish in this manner is an almost impossible task. Moreover, it is not uncommon for a fish to slip out of the fisherman's hands when he is trying to measure it. If the fish has been unhooked from the line, the fish escapes. If the fish has not been unhooked from the line, it is possible for the fish to be so severely injured that it dies, even though the fisherman subsequently unhooks the fish and releases it because of its being undersize.

In addition to the foregoing, the fisherman's efforts to prevent the fish's slipping out of his hands sometimes results in the loss not only of the fish, but also of the measuring device.

An object of this invention is to provide a fish measuring device which overcomes the disadvantages of known devices used heretofore for similar purposes.

Another object of the invention is to provide a fish measuring device which supports a fish in such manner as to minimize the risk of losing the fish.

A further object of the invention is to provide a fish measuring device which makes it possible for one to unhook the fish and support the fish for measurement in such manner as to avoid any likelihood of injuring the fish.

Another object of the invention is to provide a fish measuring device which is quite accurate in determining the length of a fish.

A further object of the invention is to provide a fish measuring device which avoids the risk of loss of the device in the event it inadvertently should be dropped by the user.

Another object of the invention is to provide a fish measuring device which is capable of use either in the daytime or in the nighttime with equal facility.

Another object of the invention is to provide a fish measuring device of the character referred to which is economical to manufacture, and rugged and durable in use.

Other objects and advantages of the invention will be pointed out specifically or will become apparent from the following description when it is considered in conjunction with the appended claims and the accompanying drawings, in which:

FIGURE 1 is a top plan view of a measuring device constructed in accordance with the invention;

FIGURE 2 is a side elevational view of the measuring device; and

FIGURE 3 is a transverse sectional view taken on the line 3—3 of FIGURE 1.

A measuring device constructed in accordance with the invention comprises a hollow body 1 formed of moldable plastic material such as polystyrene, polypropylene, butyrate or the like. The body may be vacuum or injection molded, or hot-stamped into sections and subsequently heat-welded to form a one-piece body. The body comprises a top wall 2, a parallel bottom wall 3, and a pair of opposed side walls 4. One end of the body member is closed by a closure wall 5, the other end of the body being open.

As is best shown in FIGURE 1, the side walls 4 of the body taper toward one another in a direction toward the closed end of the body. Preferably, the point from which the side walls taper is closer to the closed end of the body than it is to the open end of the latter. In a measuring device having an overall length of ten inches, it has been found that satisfactory results can be obtained if the side walls of the body begin to taper from a point about four inches from the closed end of the body.

It has been found that a body having a wall thickness of .040 inch provides a satisfactory measuring device when the height of the device is about one and one-half inches and the non-tapering width is about three inches. In such a device, the tapering of the side walls toward the end wall 5 in such manner as to provide a two-inch width at the closed end of the body provides a satisfactory device.

Preferably, the measuring device is so constructed that it is generally elliptical in cross-section, although it is possible to make the body of substantially rectangular configuration. In any event, the shape and size of the body should be such as to enable a fish to be inserted in the body, head first, with ease.

To enable the apparatus to be utilized for measuring the length of a fish, indicia such as spaced apart marks 7 are provided on one of the walls 2 or 3 and on either the inner or the outer surface thereof. For convenience, each of the scale marks 7 may be numbered and, if desired, the marks may be spaced from one another a distance of one-half inch.

Means is provided for anchoring a line, or the like (not shown), to the body 1 so as to prevent losing out of the device in the event it inadvertently should be dropped by a fisherman. The anchor means comprises a thin, planar flange 8 that preferably is integrally formed with the end wall 5 and extending in prolongation of the body, the flange having an opening 9 for the reception of the line.

In use, the body 1 may be tethered to the fisherman's belt or creel so as to be readily available for use when needed. When a fish of questionable length is caught, the hook may be removed from the mouth of the fish, the fish then inserted, head first, into the body 1 so that the mouth of the fish bears against the inner surface of the wall 5. The tapered portion of the body 1 prevents excessive play between the head of the fish and the side walls of the body 1. With the fish inside the body, the fisherman may hold the body with its open end uppermost and read correctly the length of the fish. The fisherman thus is able to hold both the measuring device and the fish with one hand, determine accurately the length of the fish, and at the same time positively restrain the fish against loss.

If the fish is shorter than the legal limit, it is a simple matter to release the fish from the measuring device into the stream or other body of water, and without injuring the fish in any manner. If the fish is of legal limit the fish may be released to a creel or other place.

It is contemplated that the measuring device may be used at night and it is preferable that the device be capable of use without the necessity of an external source of light. Accordingly, the portions of the side wall at or adjacent the scale marks 7 may be impregnated with any one of a number of known phosphorescent materials so as to emit light. In such a construction, the insertion of the fish in the body 1 will enable the length of the fish to be determined.

The disclosed embodiment is representative of the presently preferred form of the invention, but is intended to be illustrative rather than definitive thereof. The invention is defined in the claims.

I claim:

1. A measuring device comprising side walls forming a hollow body of generally elliptical cross section, at least one of said walls having a transparent portion extending substantially the full length of said body; a closure wall at one end of said body; measuring indicia carried by one of the side walls of said body in a position to be visible through said transparent wall portion, said indicia extending longitudinally of said body from said closure wall, said body tapering from a point between its ends toward said one end whereby said body has a smaller cross sectional area at said one end than at its other end; and substantially planar, thin anchor means joined to one of said walls and extending in prolongation of said body and to which a line or the like may be anchored.

2. The construction set forth in claim 1 wherein said anchor means is joined to said closure wall.

3. The construction set forth in claim 1 including a phosphorescent substance embedded in a side wall of said body to render said indicia visible in darkness.

References Cited by the Examiner

UNITED STATES PATENTS

| | | | |
|---|---|---|---|
| 1,474,804 | 11/1923 | Tyrrell | 33—168 |
| 2,198,256 | 4/1940 | Levy. | |
| 2,666,329 | 1/1954 | Hiller | 250—72 X |

FOREIGN PATENTS 163,598  7/1949  Austria.

ISAAC LISANN, *Primary Examiner.*

SAMUEL S. MATTHEWS, *Examiner.*